United States Patent
Carden, IV et al.

(10) Patent No.: US 6,802,066 B1
(45) Date of Patent: Oct. 5, 2004

(54) METHOD AND SYSTEM TO SHARE CIRCULAR BUFFER WITHOUT USING LOCKING MECHANISM

(75) Inventors: Robert Clinton Carden, IV, Trabuco Canyon, CA (US); Michael James Irving, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/358,796

(22) Filed: Jul. 22, 1999

(51) Int. Cl.[7] .................................................. G06F 9/46
(52) U.S. Cl. ........................................................ 719/312
(58) Field of Search ................................ 709/312, 313, 709/314, 315; 719/312, 313, 316, 315; 710/52–57; 718/100

(56) References Cited

U.S. PATENT DOCUMENTS

| | | | | |
|---|---|---|---|---|
| 4,623,997 A | * | 11/1986 | Tulpule | 711/141 |
| 4,635,254 A | * | 1/1987 | Tulpule et al. | 711/141 |
| 5,339,418 A | * | 8/1994 | East et al. | 709/314 |
| 5,797,035 A | * | 8/1998 | Birrittella et al. | 710/35 |
| 5,920,719 A | * | 7/1999 | Sutton et al. | 717/130 |
| 6,557,056 B1 | * | 4/2003 | Lanteigne et al. | 710/52 |

* cited by examiner

Primary Examiner—John Follansbee
Assistant Examiner—Haresh Patel
(74) Attorney, Agent, or Firm—Nathan Cass; Mark T. Starr; Lise A. Rode

(57) ABSTRACT

A software buffer is implemented without using notoriously slow locking mechanisms by employing a so-called atomic microprocessor operation to increment a counter tracking the total number of messages inserted into the buffer by various processes. In this manner, a unique slot is guaranteed to be assigned to each respective message to be inserted. Additionally, a count of the total number of removed messages is used to handle situations where two messages are assigned the same slot due to buffer overflow.

16 Claims, 5 Drawing Sheets

METHOD AND SYSTEM TO SHARE CIRCULAR BUFFER WITHOUT USING LOCKING MECHANISM

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The subject invention relates generally to computer systems and more particularly to a software implemented lockless circular buffer.

BACKGROUND OF THE INVENTION AND RELATED ART

In the past, emulation software has been employed together with a number of microprocessor chips to emulate mainframe hardware. Such emulation software is comprised of many processes, each of which emulates a piece of prior art hardware, such as a central processor, an I/O processor or a task control unit. The processes request actions from each other by sending messages. Each message is 4 (64-bit) words long. For the system to function properly, the receiving process must receive messages in the order they are sent. Message ordering is critical. For example, a first of two messages might indicate a first value to be written in a disk storage space and the second message an update of that value. If the messages are reversed, the incorrect value will be stored on disk.

The emulator implements message ordering by establishing a circular buffer for each process—a fixed length area where messages are placed when they are sent to the process. Sending processes put messages in each successive slot in the buffer, and the receiving process retrieves them in the same order, according to a first-in, first-out (FIFO) protocol. Thus, each process can have at most a fixed number of messages waiting to be processed.

Several processes can be simultaneously attempting to send a message to a particular process. To prevent the loss of messages, the implementation must ensure that each process uses a unique slot in the buffer. In the prior art, locking mechanisms such as Mutexes, Semaphores, or Critical Regions have been employed to control and order access to the buffer. Such "locking" approaches are notoriously slow since one process must wait while another process has a lock on the buffer.

SUMMARY OF THE INVENTION

The invention provides a lockless circular buffer. Slots in the buffer are assigned using a counter which is incremented atomically. In this manner, a process can fetch the counter from memory, increment it by 1, and store it back into memory without the possibility of interruption by another process. This "atomic" operation assures that a unique slot number will be assigned to each process request, even though such requests occur simultaneously. Two counters are kept for each buffer: one contains the number of messages inserted and the other contains the number of messages removed. The number of the last message removed is used to resolve overflow situations where the buffer fills up, resulting in two processes being assigned the same slot number.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
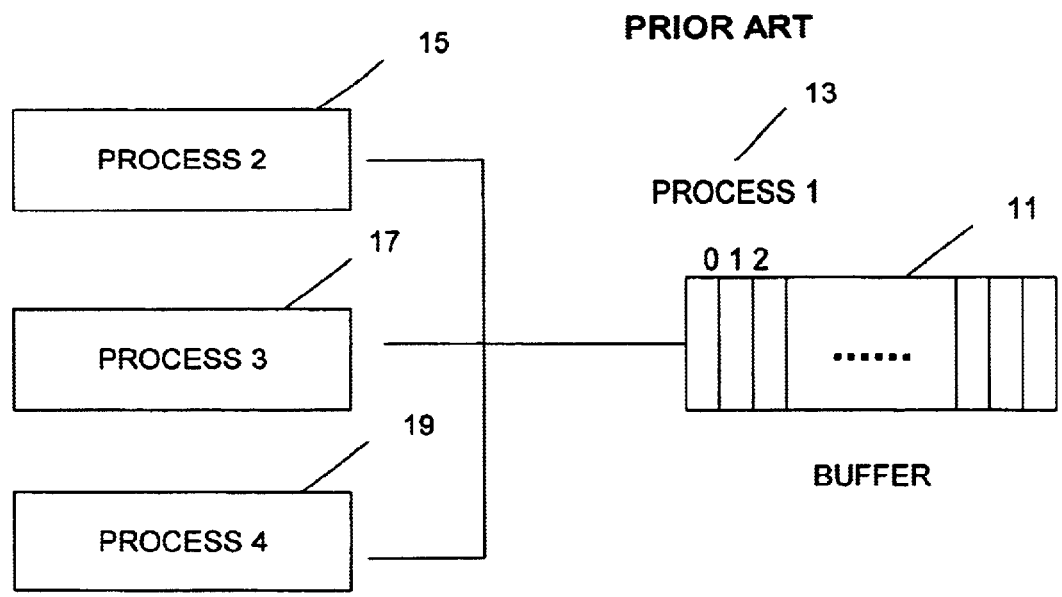
FIG. 1 is a schematic block diagram illustrating a number of processes which may request a slot in a buffer established by another process.

FIG. 1 illustrates a buffer 11 associated with a first process 13. Three other processes 15, 17, 19 are shown, each of which may wish to send a message to the first process 13 by placing such a message in the buffer 11. Such a message might, for example, instruct the first process to perform an I/O operation. While multiple processes may send messages to the buffer 11, only the first process 13 may remove messages from the buffer 11. In the preferred embodiment, each of the other three processes 15, 17, 19 has a buffer like buffer 11 so that all the processes may send messages to one another.

Figure 2:
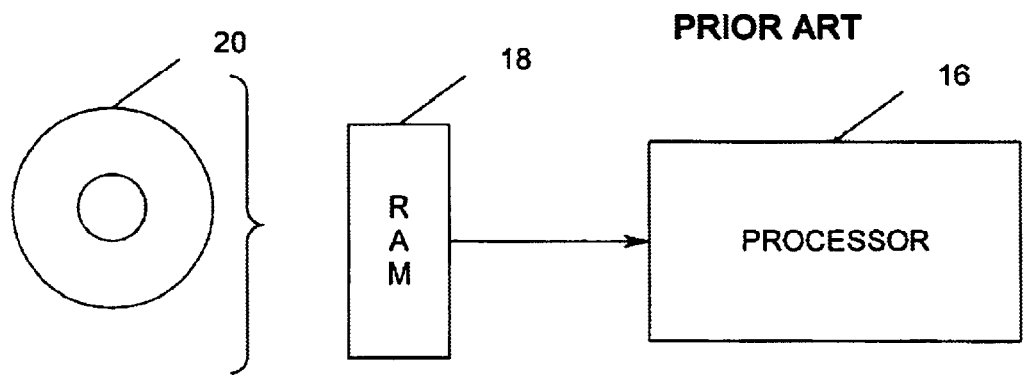
FIG. 2 is a block diagram illustrating data processing apparatus according to the preferred embodiment.

One example of the use of a number of processes as illustrated in FIG. 1 is in the use of a plurality of microprocessor chips to emulate a prior art main frame computer. Such a plurality of microprocessor chips may comprise a processor 16 as shown in FIG. 2. In FIG. 2, the processor 16 may comprise, for example, two or four microprocessors. Each of the microprocessors may be, for example, an Intel Pentium Zeon operating at 500 MHz. The processor 16 is caused to emulate a desired main frame computer by emulation software contained in a random access memory (RAM) 18. The emulation software is typically loaded into RAM 18 from a CD ROM 20. In one embodiment, the processes of the emulation software each emulate an actual piece of prior art main frame hardware, such as a central processor, an I/O processor and a Task Control Unit (TCU). It should be understood that the just described emulation environment is but one example of a system wherein the preferred embodiment finds application. Generally, the preferred embodiment is applicable in any situation where a number of processes need to communicate with one another.

The lockless buffer of the preferred embodiment is created and controlled by a program written in "C" and stored in RAM 18 and CD ROM 20. The buffer 11 per se is implemented or established by instructions comprising part of process 13, which is typically initiated when a user starts the emulation software by clicking a PC mouse on an icon.

State structures for the buffers and messages are also established via the software provided on ROM 20. Associated with each buffer 11 is a control structure that contains the following information:

Insert Count Number of messages that have been inserted in the buffer
Remove Count Number of messages that have been removed from the buffer
Buffer Size Number of message slots in the buffer
Insert Event Caused when a message is inserted and a consumer "remover" is waiting to remove a message
Remove Event Caused when a message is removed and an inserter is waiting Additionally, each slot in the buffer 11 is arranged to contain the following binarily encoded information:

Message State The state of the slot:
  Active inserter count
  Remover waiting
  Message ready to be removed
Message The content of the message in the slot
Message Number The Insert Count corresponding to the message stored in the slot.

Figure 3:
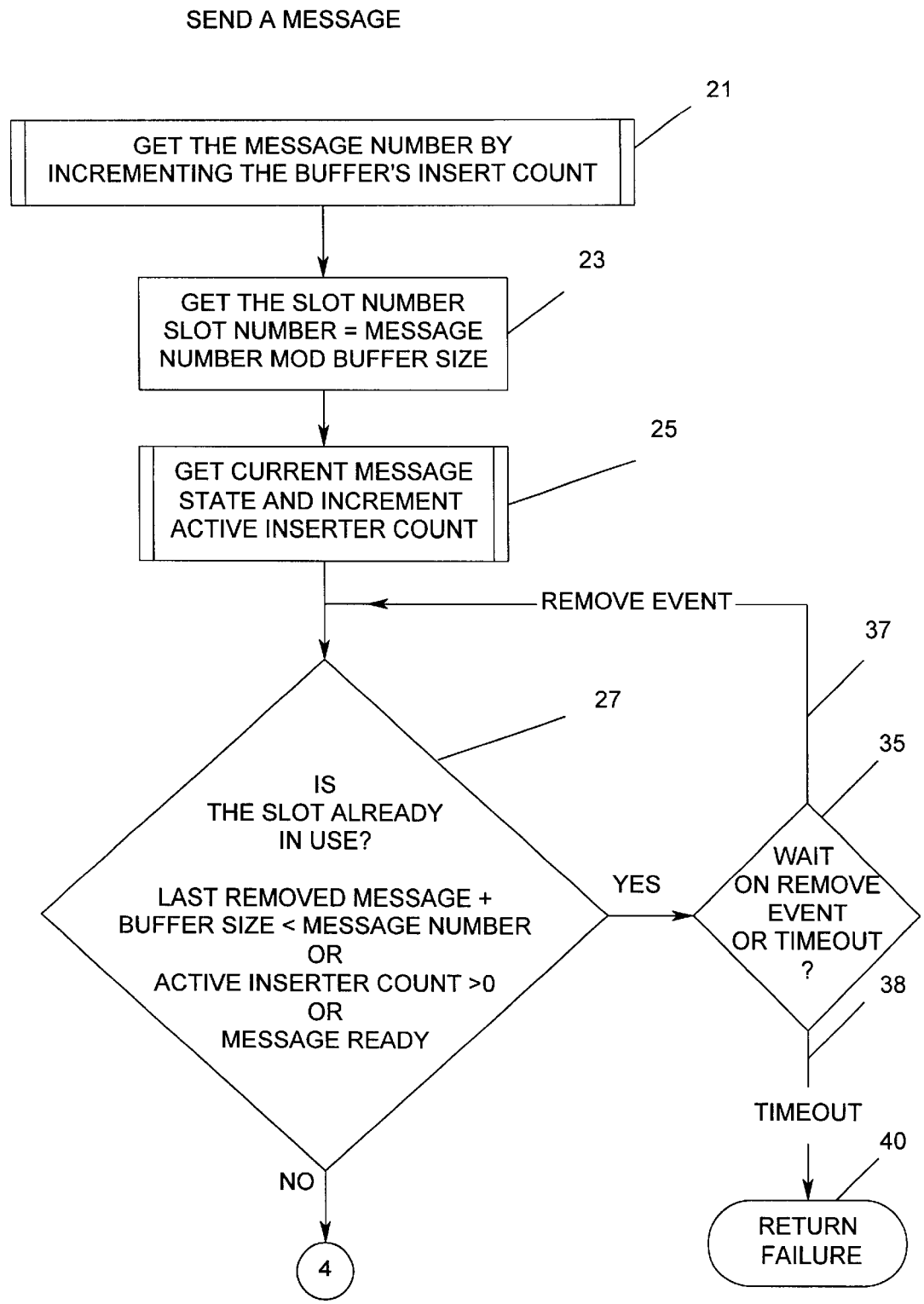
FIG. 3 is a portion of a flow diagram illustrating the method and apparatus according to the preferred embodiment.
Figure 4:
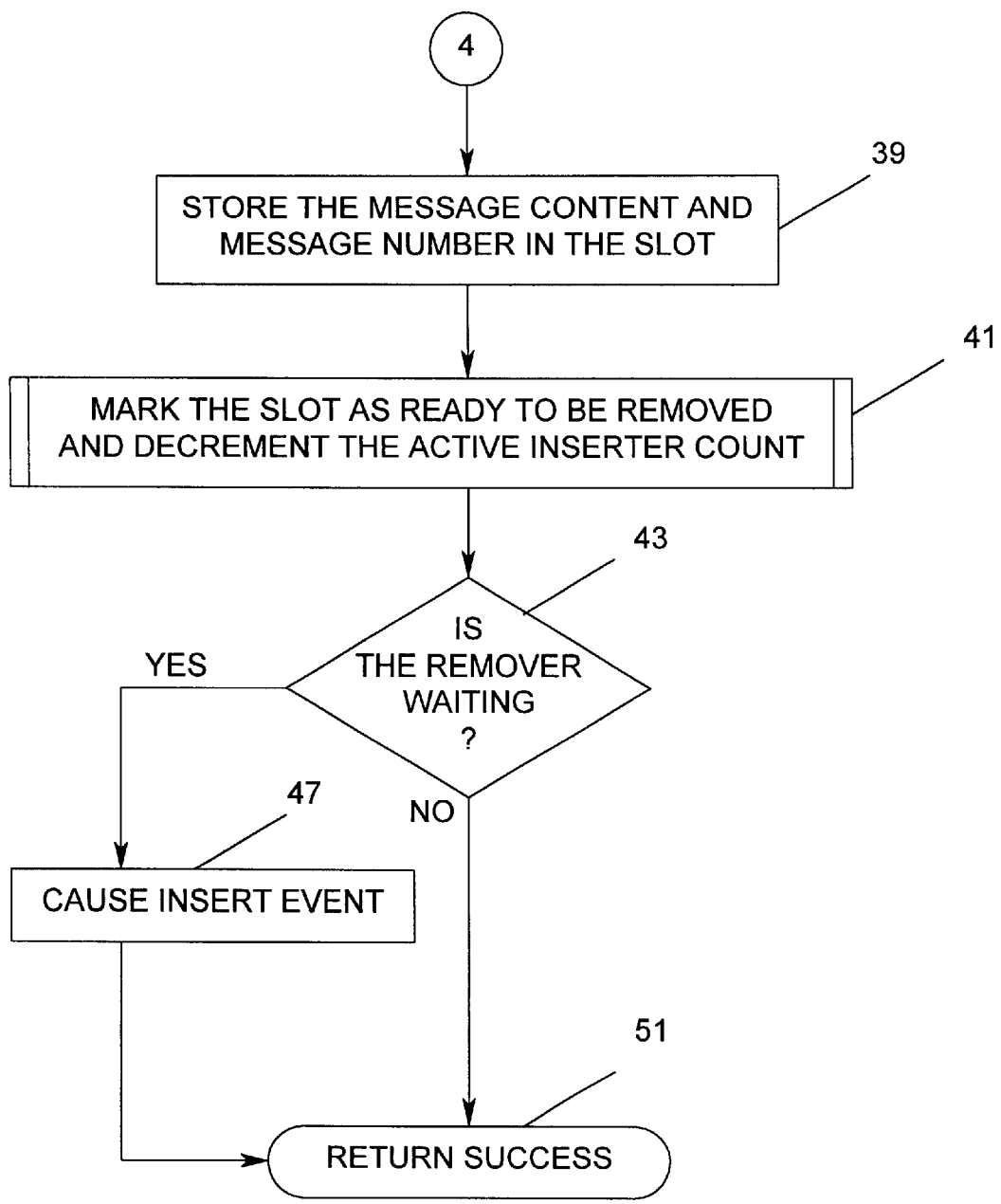
FIG. 4 is a continuation of the diagram of FIG. 3.

When one of the processes 15, 17, 19 wants to send a message to process 13's buffer 11, the software routine proceeds to perform the steps illustrated in FIGS. 3 and 4.

In step 21 of FIG. 3, the Message Number of the message to be inserted is obtained by incrementing the Insert Count. The Insert Count comprises a very large word or "counter," for example, 64 bits, stored in memory, which is incremented each time a message is inserted into the buffer 11. Initially, the Message Number is "−1." It is incremented to "0" for the first message, "1" for the second message etc.

In the preferred embodiment, the step 21 is performed using the XADD instruction of the Intel Pentium processor via the InterlockedIncrement function in Microsoft C. Thus, step 21 is performed "atomically", that is the sending process fetches the counter from memory, increments it by one, and stores it back into the memory without the possibility of interruption by another process.

In the next step, 23, the slot number is determined by performing the operation:
  Message Number (mod) Buffer Size
For example, if the Message Number is 1234, and the buffer size is 256 (2⁸), the slot number equals: 1234 (mod) 256= 210 (i.e., the remainder of 1234 divided by 256 is 210).

In the next step 25, the sending process obtains the current slot state and increments the active writer inserter count of the Message State. This step 25 is also performed atomically using the XADD instruction to insure integrity of the active inserter count variable.

In the next step 27, the sending process performs a test to determine whether the slot computed in step 25 is available to receive a message. According to the preferred embodiment, a slot is determined to be already in use if the number of the last message removed from the buffer 11 when added to the buffer size results in a number which is less than the Message Number assigned to the message waiting to be inserted. Thus, if the Last Removed Message is 970, the resulting sum is 970+256=1226. If the Message Number is 1234 as in the above example, slot 210 is not yet available. The slot is also determined to be already in use if the Active Inserter Count is greater than zero or if the "Message ready to be removed" bit of the Message State is set.

If a slot is not available, the flow proceeds to decision point 35 where the sending process awaits removal of a message from the buffer 11, which could potentially open a slot for the waiting message. If a remove event occurs, the flow proceeds along path 37 to the test 27 to determine whether the slot has now become available. If, while a process is at decision point 35, a remove event does not occur within a selected timeout, the process proceeds along path 39 (FIG. 4) to the "return failure" step 40.

According to the preferred embodiment, the message passing module is only responsible for trying to pass a message from one process to another. Thus, at step 40, if the receiving process appears to have stopped accepting messages, the message could not be delivered. What the sender does at this point is dependent on the application. Some senders may decide to try again later. Some may put out an error message to the operator and abort themselves. The particular response depends on the application and the criticality of the message. In an emulator, the senders will typically inform the operator and halt the emulator.

If, on the other hand, a slot is determined to be available at test 27, the flow proceeds to step 39 where the message content and message number are stored in the slot identified in step 23. Next, in step 41, the message state is marked as "ready to be removed." This marking allows the Remover to distinguish between a slot where the message is in the process of being inserted (i.e., the data has not yet been completely transferred) and a slot from which the Remover can safely extract a complete message. The active inserter count is also decremented since the process in question is no longer attempting to insert a message into the buffer. The decrementing of the active inserter count is again performed atomically via the XADD instruction.

The flow next proceeds to test 43 to determine whether the remover is waiting. If so, an insert event is caused in step 47. If not, the flow proceeds directly to the "return success" point 51. By returning success, the message passing module is telling the sender that the message has been successfully placed in the buffer 11. Typically the sender will then continue on with its assigned tasks assuming that the receiving process will eventually receive and act on the message.

Figure 5:
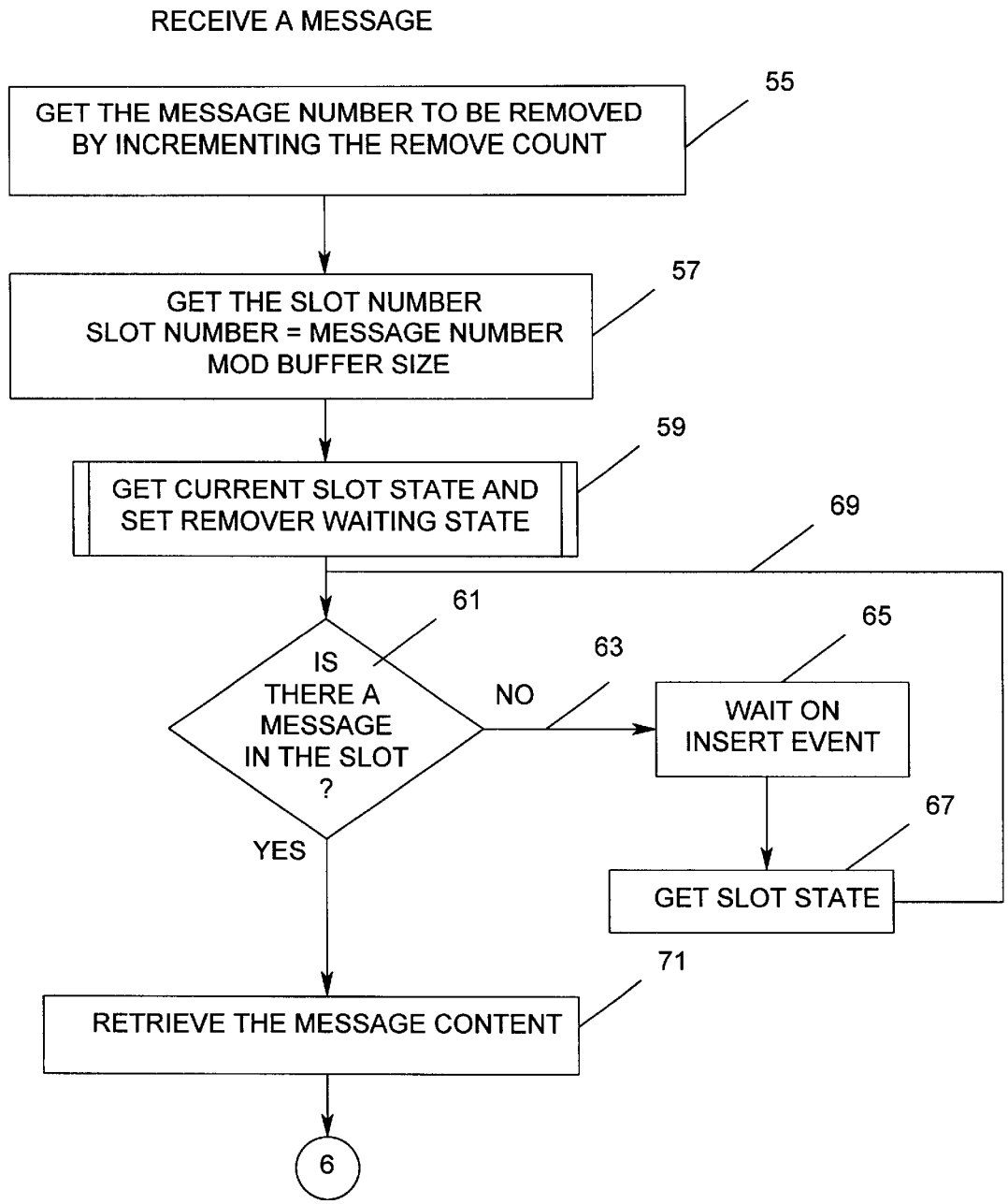
FIG. 5 is a portion of a second flow diagram illustrating the method and apparatus according to the preferred embodiment.
Figure 6:
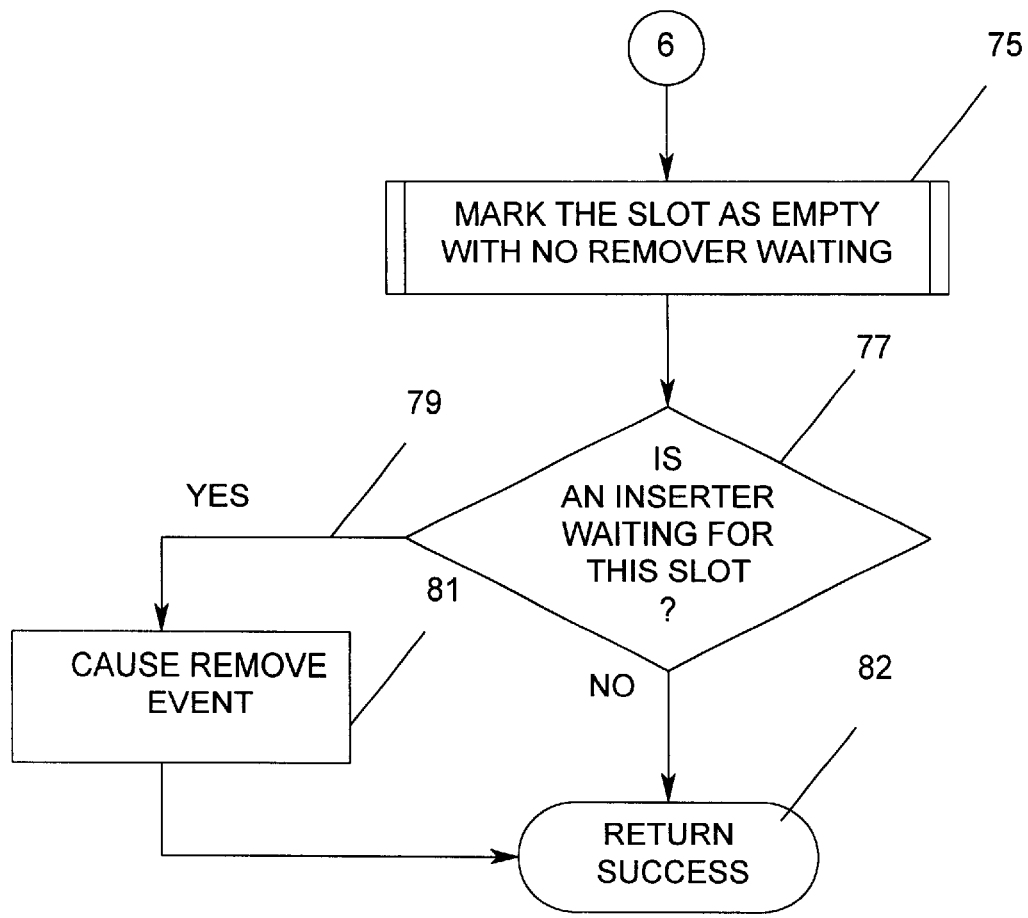
FIG. 6 is a continuation of the flow diagram of FIG. 5.

The procedure which process 13 uses to remove a message from the buffer 11 is illustrated in FIGS. 5 and 6. According to step 55 of FIG. 5, the Message Number of the message to be removed is computed by incrementing the Remove Count. This step need not be achieved by an atomic operation since there is only one remover. In step 57, the slot number of the message to be removed is determined by performing the operation:
  Message Number (mod) Buffer Size.

Then, in step 59, the process 13 gets the current Message State of the slot so determined and sets the "Remover waiting" bit of the Message State. Step 59 is also performed atomically by XADD to ensure integrity of the procedure. The "message ready to be removed" indication of the Message State is then tested in Step 61. If there is a message ready to be removed, i.e., a message in the slot, the process proceeds to Step 71 to retrieve the message content. If there is no message in the slot, the procedure follows along path 63 to Step 65 wherein the remover process waits on an insert event to occur, i.e., the process waits on a slot to be filled with a message. If an insert event occurs, the remover process obtains the Message State in Step 67 and returns to perform test 61.

When a message is retrieved in step 71 of FIG. 5, the process proceeds to step 75 (FIG. 6) wherein: the slot from which the message was just removed in step 71 has its state marked to indicate the slot as empty with no remover waiting. Upon completion of step 75, an inquiry is made as to whether or not an inserter is waiting for this slot (diamond 77). If the answer to this inquiry is yes, then the event is caused (block 81) and a return of Success is sent (bubble 82). On the other hand, if no inserter is waiting for this slot, then Success is returned without having to cause the event.

From the foregoing, it will be appreciated that the algorithm according to the preferred embodiment relies on the XADD and XCHG instructions of the Intel Pentium processor (via the InterlockedIncrement, InterlockedDecrement and InterlockedExchangeAdd functions in Microsoft C). Such instructions allow a counter to be incremented atomically. That is: a process can fetch the counter from memory, increment it by 1, and store it back into memory without the possibility of interruption by another process. Two such counters are kept for each buffer: one contains the number of messages inserted and the other contains the number of messages removed. These are used to control situations where different processes seek simultaneous access.

To further illustrate, assume that two Central Processing Modules (CPMs) wish to read the disk which in a multi-processing system can happen virtually simultaneously. A CPM initiates the read by sending a message to the IO Processor (IOP). We now have a situation where both CPMs need to insert messages into the IOP's buffer. When a CPM sends a message to the IOP, the first thing the IOP does is atomically increment the IOP's sent message counter. The result is the message number of its message. The slot in the IOP's buffer that the CPM will use is determined by taking the message number modulo the size of the buffer. Thus, according to the above-given example: if the message number is 1234 and the number of messages the buffer can hold is 256, the message will go into slot 210 (1234 mod 256=210). Because of the atomicity of the XADD operator, each CPM will have a different message number and thus will use a different slot. The second CPM will increment the Message Count to 1235 and use slot 211. Once the CPM has a slot number, it then waits, if necessary, for that slot to become available (there might be a message already there that hasn't yet been consumed by the IOP) and proceeds to insert its message.

There are situations, however, when two message senders can get the same slot number. That will happen when the senders (inserters) are sending messages faster than the receiver (remover) can process them. The buffer will fill up, and the sending processes will be forced to wait for the receiver to empty their respective slots before they can insert the message. If enough senders are waiting, two or more can be waiting for the same slot. In the above example, if more than 256 senders are waiting for the IOP to process messages, the CPM described above would be waiting to insert message 1234 into slot 210 and another sender would be waiting to insert message 1490 into the same slot (1490 mod 256 is also 210). When the message in slot 210 is finally received and the slot becomes available, the senders need to be able to determine which should use the slot next. The insert algorithm therefore has each sender check the number of the last message removed by the receiver (Step 27 of FIG. 3). If a sender's message number is within 256 of the last received message number, then it is that sender's turn to use the slot. Otherwise, the sender continues to wait until the slot becomes available again.

As those skilled in the art will appreciate, the methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Those skilled in the art will thus appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method of handling messages transmitted from a plurality of processes operating in a data processing system to a receiving process in said system comprising:

establishing an n-slot circular a message buffer serving said receiving process and comprising a plurality of message slots;

establishing a counter, the value of said counter representing the total number of messages which have been inserted in the buffer by said plurality of processes;

employing an atomic processor operation to increment said counter each time one of said processes requests a message slot, thereby assigning a unique counter value to each message to be inserted in said buffer;

determining the actual slot number assigned to a message in said buffer by determining the remainder of the counter value in view of the number of slots of said buffer; and responding to competing requests for the same slot from first and second of said processes to correctly allocate an available slot of said buffer to one of said first and second processes by determining whether the addition of Remove Count with Buffer Size is less than the Message Number;

wherein the Remove Count is a count of the total number of messages removed from the buffer, the Message Number is the counter value assigned to the message to be inserted, and the Buffer Size is the number of slots in the buffer.

2. The method of claim 1 wherein, if a slot is determined to be available, a message and the Message Number are inserted in the available slot.

3. The method of claim 2 wherein a bit in the available slot is further set to indicate the message in that slot inserted is ready to be removed.

4. The method of claim 3 wherein an Active Inserter Count is maintained in the available slot and is decremented when said message is inserted therein.

5. The method of claim 1 wherein said method further comprises establishing the following control structure comprising:

an Insert Count representing the number of messages that have been inserted in the buffer;

a Remove Count representing the number of messages that have been removed from the buffer;

a Buffer Size representing the number of message slots in the buffer;

an Insert Event representing the event caused when a message is inserted and a consumer "remover" is waiting to remove a message;

a Remove Event representing the event caused when a message is removed and an inserter is waiting.

6. The method of claim 5 wherein each slot in the message buffer contains the following binarily encoded information:

(a) Message State representing the state of the slot: Active inserter count, Remover waiting or Message ready to be removed;

(b) Message representing the content of the message in the slot;

(c) Message Number representing the Insert Count corresponding to the message stored in the slot.

7. The method of claim 5 further comprising the step of incrementing said Remove Count in determining the next message to be removed from the buffer.

8. The method of claim 7 further comprising determining the slot number of the next message to be removed in an n-slot buffer by performing the operation (incremented Remove Count) mod (n).

9. The method of claim 8 further comprising the step of setting a bit in the slot having said slot number to indicate that a remover process is waiting to remove a message from that slot.

10. The method of claim 9 wherein said step of setting a bit is performed by an atomic processor operation.

11. The method of claim 10 wherein a "message ready to be removed" bit is tested to determine whether to proceed to remove a message from the slot having said slot number.

12. A storage medium encoded with machine-readable computer program code, wherein when the program code is executed by a computer, the computer performs the steps of:

establishing an n-slot circular a message buffer serving said receiving process and comprising a plurality of message slots;

establishing a counter, the value of said counter representing the total number of messages which have been inserted in the buffer by said plurality of processes;

executing all atomic processor operation to increment said counter each time one of said processes requests a message slot, thereby assigning a unique counter value to each message to be inserted in said buffer;

determining the actual slot number assigned to a message in said buffer by determining the remainder of the counter value in view of the number of slots of said buffer; and responding to competing requests for the same slot from first and second of said processes to correctly allocate an available slot of said buffer to one of said first and second processes by determining whether the addition of Remove Count with Buffer Size is less than the Message Number;

wherein the Remove Count is a count of the total number of messages removed from the buffer, the Message Number is the counter value assigned to the message to be inserted, and the Buffer Size is the number of slots in the buffer.

13. The storage medium of claim 12 wherein the computer performs the additional step of incrementing said Remove Count in determining the next message to be removed from the buffer.

14. The storage medium of claim 13 wherein the computer performs the additional step of determining the slot number of the next message to be removed in an n-slot buffer by performing the operation (incremented Remove Count) mod (n).

15. The storage medium of claim 14 wherein the computer performs the additional step of setting a bit in said slot indicating that a remover process is waiting to remove a message.

16. The storage medium of claim 15 wherein the additional step of setting a bit is performed by an atomic processor operation.

* * * * *